Patented May 2, 1944

2,347,704

UNITED STATES PATENT OFFICE 2,347,704

AZO COMPOUNDS

James G. McNally and Joseph B. Dickey, Rochester, N. Y., assignors to Eastman Kodak Company, Rochester, N. Y., a corporation of New Jersey No Drawing. Application January 8, 1942, Serial No. 426,056

3 Claims. (Cl. 260—205)

This invention relates to the new azo compounds having the formula:

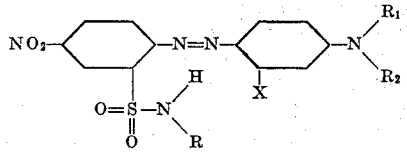

wherein R represents a member selected from the group consisting of a methyl group, an ethyl group, a propyl group, a butyl group, an allyl group, a β-methoxyethyl group, a β-ethoxyethyl group, a β-hydroxyethyl group, a β-hydroxypropyl group, and a γ-hydroxypropyl group, $R_1$ represents a member selected from the group consisting of a methyl group, an ethyl group, a β-methoxyethyl group, a β-ethoxyethyl group, a β-hydroxyethyl group, a β-hydroxypropyl group, a γ-hydroxypropyl group and an allyl group, $R_2$ represents a member selected from the group consisting of a β-hydroxyethyl group, a β-hydroxypropyl group, a γ-hydroxypropyl group, a β,γ-dihydroxypropyl group, a β-methoxyethyl group, and a β-ethoxyethyl group and X represents a member selected from the group consisting of hydrogen and a methyl group and to textile materials colored therewith.

The azo compounds of our invention constitute valuable dyes for the coloration of textile materials such as organic derivatives of cellulose, wool, silk, "nylon" and "Vinyon" and wool-like fibers derived from protein-like materials, such as casein wool. They are particularly of value for the coloration of cellulose acetate. Lacquers composed of cellulose esters, cellulose ethers and vinyl derivatives, for example, also can be colored. Coloration can be effected by dyeing, printing, stenciling or other suitable methods.

It is an object of our invention to provide a new class of azo dye compounds. Another object of our invention is to provide a process for the coloration of organic derivative of cellulose, wool, silk, nylon and "Vinyon" textile materials. A further object is to provide colored textile materials which possess good fastness properties and which are readily discharged. A specific object is to provide colored cellulose acetate textile materials which have good fastness and dischargeability properties. Other objects will hereinafter appear.

Typical organic derivatives of cellulose include the hydrolyzed as well as the unhydrolyzed cellulose organic acid esters such as cellulose acetate, cellulose formate, cellulose propionate or cellulose butyrate and the hydrolyzed as well as the unhydrolyzed mixed organic acid esters of cellulose such as cellulose acetate-propionate, cellulose acetate-butyrate and the cellulose ethers such as methyl cellulose, ethyl cellulose or benzyl cellulose.

The dyeings obtained with the dye compounds of our invention are characterized by exceptional light fastness and by good fastness properties to gas fumes, washing and perspiration. Further, the dye compounds of our invention possess good affinity for the textile materials named and can be applied rapidly thereto at relatively low temperatures. The advantages of the dye compounds appear to be realized to their greatest extent when cellulose acetate is the material to be colored.

The azo compounds of our invention can be prepared by diazotizing compounds having the formula:

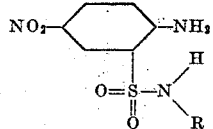

wherein R has the meaning previously assigned to it and coupling the diazonium compounds obtained with the compounds having the formula:

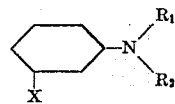

wherein $R_1$, $R_2$ and X have the meaning previously assigned to them.

Of all the compounds we have investigated in our extensive researches with compounds of the character indicated herein the following appear to equal or excel any others: 4'-nitro-2'-sulfonethylamidebenzeneazo-4 - di-β-hydroxyethylamino - benzene, 4' - nitro-2'-sulfonethylamidebenzeneazo-4-(ethyl-, β,γ-dihydroxypropyl-) aminobenzene and 4'-nitro-2'-sulfon-β-methoxyethylamidebenzeneazo-2-methyl-4-(ethyl-, β,γ-dihydroxypropyl-) aminobenzene. Because of the outstanding excellence of these dyes particular claim is laid thereto.

The following examples illustrate the preparation of the azo compounds of our invention:

Example 1

(A) One gram mole of sodium nitrite is dissolved at 15° C. in 530 cc. of 93% sulfuric acid, the mixture heated to 70° C. and then cooled to 10–15° C.

(B) One gram mole of 2-amino-5-nitrophenylmethylsulfonamide is dissolved in 2200 cc. of hot acetic acid and rapidly cooled to 10–15° C.

The diazotization is carried out by adding solution B to solution A over a period of 30–45 minutes, while maintaining a temperature of 10–15° C. and stirring continuously. Upon completion of the diazotization reaction, the reaction mixture is poured into water and the yellow diazonium solid which separates is recovered by filtration and washed free of mineral acid.

Coupling is effected by adding the diazonium compound formed above to a cold acetic acid solution of one gram mole of methyl, β-hydroxyethylaniline. Throughout the coupling reaction which takes place the reaction mixture is maintained in a cooled condition and stirred. When coupling is complete, cold water is added to the reaction mixture, following which the dye compound formed is recovered by filtration, washed with water and dried. The dye compound obtained, which has the formula:

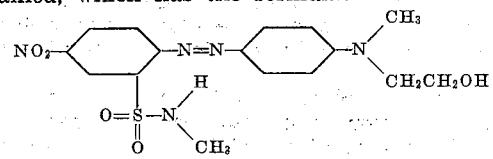

colors cellulose acetate pinkish-rubine shades, which have splendid light fastness properties.

in accordance with the procedure described in Example 1. The dye compound obtained colors cellulose acetate pinkish-rubine shades which are bluer than those obtained with the dye of Example 2. The dyeings obtained possess excellent light fastness properties.

*Example 4*

1 gram mole of 2-amino-5-nitrophenyl-β-methoxyethylsulfonamide is diazotized and the diazonium compound obtained is coupled with 1 gram mole of ethyl-β,γ-dihydroxypropyl-m-toluidine. The diazotization and coupling reactions can be carried out in accordance with the procedure described in Example 1. The dye compound obtained colors cellulose acetate pinkish-violet shades which possess excellent light fastness properties.

The following tabulation further illustrates the compounds included within the scope of our invention together with the color they produce on the textile materials named herein. The compounds indicated below may be prepared by diazotizing the amines listed under the heading "Amine" and coupling the diazonium compounds obtained with the compounds in the column entitled "Coupling component." The diazotization and coupling reactions may, for example, be carried out following the general procedure described in Examples 1 to 4, inclusive.

| Amine | Coupling component | Color |
| --- | --- | --- |
| (1) 2-amino-5-nitrophenylmethylsulfonamide | Methyl-β-hydroxyethylaniline | Pink. |
| (2) 2-amino-5-nitrophenylethylsulfonamide | do | Do. |
| (3) 2-amino-5-nitrophenylpropylsulfonamide | do | Do. |
| (4) 2-amino-5-nitrophenylbutylsulfonamide | do | Do. |
| (5) 2-amino-5-nitrophenylallylsulfonamide | do | Do. |
| (6) 2-amino-5-nitrophenyl-β-methoxyethylsulfonamide | do | Do. |
| (7) 2-amino-5-nitrophenyl-β-ethoxyethylsulfonamide | do | Do. |
| (8) 2-amino-5-nitrophenyl-β-hydroxyethylsulfonamide | do | Do. |
| (9) 2-amino-5-nitrophenyl-β-hydroxypropylsulfonamide | do | Do. |
| (10) 2-amino-5-nitrophenyl-γ-hydroxypropylsulfonamide | do | Do. |
| 1–10 above | Ethyl-β-hydroxypropylaniline | Do. |
| Do | Allyl-β-hydroxyethylaniline | Do. |
| Do | Allyl-β-hydroxypropylaniline | Do. |
| Do | Allyl-β-methoxyethylaniline | Do. |
| Do | β-Methoxyethyl-β,γ-dihydroxypropylaniline | Do. |
| Do | Di-β-methoxyethylaniline | Do. |
| Do | β-Hydroxypropyl-γ-hydroxypropylaniline | Do. |
| Do | Methyl-β,γ-dihydroxypropyl-m-toluidine | Pinkish-rubine. |
| Do | Methyl-β-ethoxyethyl-m-toluidine | Do. |
| Do | Methyl-β-hydroxypropyl-m-toluidine | Do. |
| Do | Ethyl-β-hydroxyethyl-m-toluidine | Do. |
| Do | Ethyl-γ-hydroxypropyl-m-toluidine | Do. |
| Do | β-Methoxyethyl-β-hydroxyethyl-m-toluidine | Do. |
| Do | β-Ethoxyethyl-β-hydroxyethyl-m-toluidine | Do. |
| Do | β-Hydroxyethyl-β-hydroxypropyl-m-toluidine | Do. |
| Do | γ-Hydroxypropyl-β-methoxyethyl-m-toluidine | Do. |
| Do | Allyl-β,γ-dihydroxypropyl-m-toluidine | Do. |
| Do | Allyl-γ-hydroxypropyl-m-toluidine | Do. |

*Example 2*

1 gram mole of 2-amino-5-nitrophenylethylsulfonamide is diazotized and the diazonium compound obtained is coupled with 1 gram mole of di-β-hydroxyethylaniline. The diazotization and coupling reactions may be carried out as described in Example 1. The dye compound obtained colors cellulose acetate pinkish-rubine shades having excellent light-fastness properties.

*Example 3*

1 gram mole of 2-amino-5-nitrophenylethylsulfonamide is diazotized and the diazonium compound obtained is coupled with 1 gram mole of ethyl-β,γ-dihydroxypropylaniline. The diazotization and coupling reactions can be carried out It will be understood that the foregoing examples are illustrative and not limitative of the invention as any of the diazonium compounds indicated herein can be coupled with any of the coupling components indicated herein. Again, while it is not specifically stated in the examples that the dyes described therein are suitable for the coloration of textile materials other than cellulose acetate they are good dyes for the textile materials disclosed herein.

Compounds having the formula:

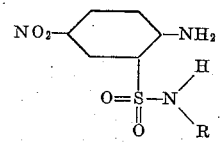

wherein R has the meaning previously assigned to it can be prepared as indicated by the following equations:

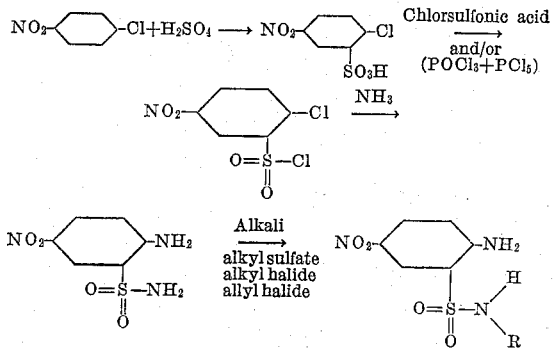

Similarly, these compounds can also be prepared by the following indicated process steps.

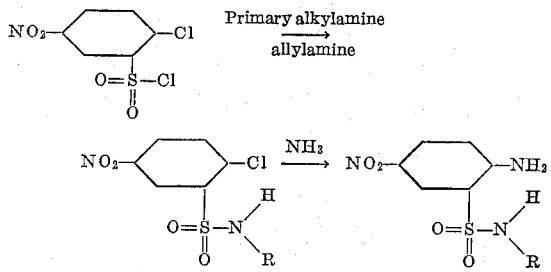

Any other suitable methods can be employed.

In the first series of equations, it will be understood that the amount of alkylating or allylating agent used determines whether one or both of the hydrogen atoms of the sulfonamide groups is replaced by an alkyl or allyl group. In the present instance only sufficient alkylating or allylating agent necessary to replace one hydrogen atom should be used.

2-amino-5-nitrophenylsulfonamide, 2-amino-5-nitrophenylmethylsulfonamide, 2-amino-5-nitrophenylethylsulfonamide and other similar type compounds can be prepared by the general method described by P. Fischer, Berichte der Deutschen Chemischen Gesellschaft, vol. 24, page 3790 (1891). The coupling components used in the preparation of the azo dye compounds of our invention can be prepared by methods known to those skilled in the art. From the foregoing, the preparation of the components used in the manufacture of the azo dye compounds will be clear to those skilled in the art.

It is here noted that the term nylon refers to a linear polyamide resin which is believed to basically be described or claimed in U. S. Letters Patent 2,071,250, issued February 16, 1937, to Wallace H. Carothers. The term "Vinyon" refers to a vinyl chloride-vinyl acetate copolymer. This material is more completely identified at pages 73 and 74 of "Synthetic Organic Chemicals," 10th edition, published October 15, 1940, by Carbide & Carbon Chemicals Corporation.

The azo compounds of our invention are, for the most part, relatively insoluble in water and, accordingly, they may be advantageously directly applied to the material undergoing coloration in the form of an aqueous suspension which can be prepared by grinding the dye to a paste in the presence of a sulfonated oil, soap or other suitable dispersing agent and dispersing the resulting paste in water. In some instances, the dye may possess sufficient solubility in water as to render the use of a dispersing agent unnecessary. Generally speaking, however, the use of a dispersing agent is desirable.

Direct dyeing operations can, with advantage, be conducted at temperatures of about 75–85° C. but any suitable temperature may be used. Thus, the textile material to be dyed or colored is ordinarily added to the dyebath at a temperature lower than that at which the main portion of the dyeing is to be effected, a temperature approximating 45–55° C., for example, following which the temperature is raised to that selected for carrying out the dyeing operation. The temperature at which the dyeing is conducted may, of course, be varied somewhat depending upon the particular material undergoing coloration. As is understood by those skilled in the art, the intensity of dyeing can be varied by varying the proportion of dye to material undergoing coloration. Generally speaking, 1–3% by weight of dye to material is employed although any desired proportions can be used.

Suitable dispersing agents together with the amounts that may be employed are disclosed in our Patent No. 2,115,030, issued April 26, 1938. The process disclosed in this patent for the dyeing of cellulose acetate silk can be used in applying the dyes of the present application to this material.

It will be understood that the other textile materials named hereinbefore can be directly colored from an aqueous dyebath in a similar manner as cellulose acetate silk. However, other suitable methods for the dyeing of these materials are known to those skilled in the art and these methods, of course, can be used in applying the dye compounds of this application if desired. We would further note that, while colors yielded by the dye compounds have been given primarily with reference to cellulose acetate silk, generally similar colors are ordinarily obtained on the other materials.

We claim:

1. The azo compound having the formula:

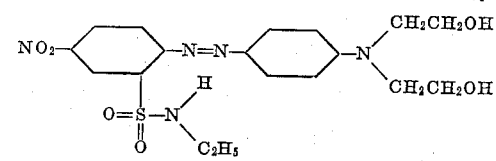

2. The azo compound having the formula:

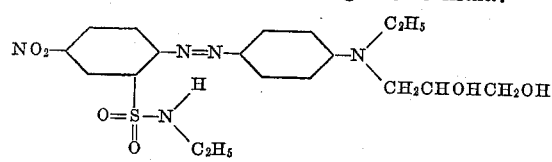

3. The azo compounds having the general formula:

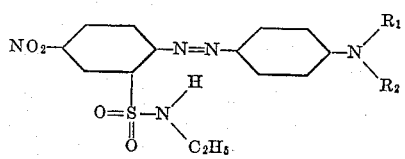

wherein $R_1$ represents a member selected from the group consisting of a lower alkyl group and a lower hydroxyalkyl group and $R_2$ represents a lower hydroxyalkyl group.

JAMES G. McNALLY.
JOSEPH B. DICKEY.